Oct. 3, 1950     C. ROUX     2,524,542
METHOD OF ARTISTIC PHOTOMODELLING BY HAND
Filed Feb. 24, 1948     2 Sheets-Sheet 1
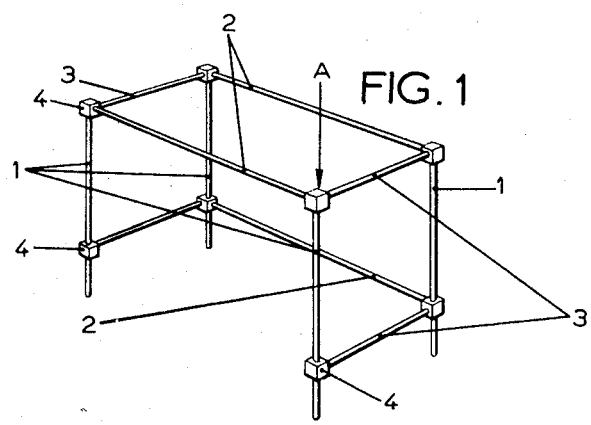
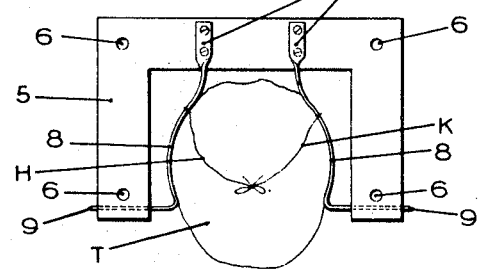
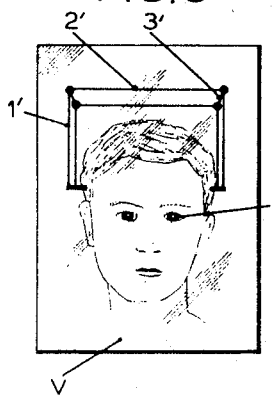
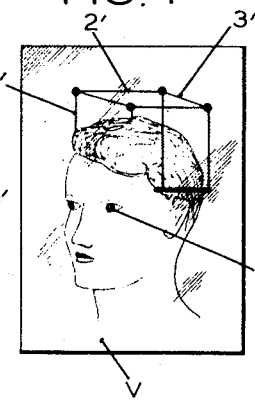
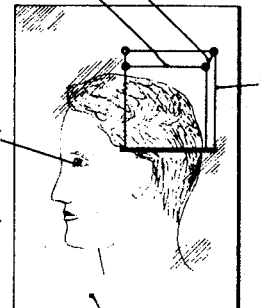
Inventor
C. Roux
By C. F. Wenderoth
Attorney Oct. 3, 1950     C. ROUX     2,524,542
METHOD OF ARTISTIC PHOTOMODELLING BY HAND
Filed Feb. 24, 1948     2 Sheets-Sheet 2

Inventor
C. Roux
By C. F. Wenderoth
Attorney

Patented Oct. 3, 1950

2,524,542

UNITED STATES PATENT OFFICE 2,524,542

METHOD OF ARTISTIC PHOTO MODELLING BY HAND

Charles Roux, Asnieres, France

Application February 24, 1948, Serial No. 10,466
In France December 19, 1944

1 Claim. (Cl. 41—25)

The invention has for its object to enable a faithful reproduction by hand modelling, of any given subject, whether inanimated such as works of art, or animated such as the bust of a living person.

The invention is based on a rational use of photographic images of the subject taken from various view-points or angles and each of which is transferred onto a transparent plate. It will be understood that such an image when viewed in transparency from a point corresponding with the position of the photographic lens relative to the subject being photographed, can be placed in perfect register with said subject, or with an exactly similar model thereof.

The invention thus makes it possible at any time during a modelling process to verify whether such modelling is being correctly carried out. It makes it possible accurately to locate and position any detail of the subject, since such details should coincide with a plurality of transparent images as seen from different view-points.

Thus, it will be advantageous to mark upon the subject prior to photographing it a certain number of points the location of which on the model may be determined with high accuracy.

The method according to the invention may be carried out through the use of simple equipment the provision of which forms a further object of the invention.

Such equipment comprises in combination a space reference frame comprising linear elements of simple geometric form and in which the subject to be photographed is placed in an accurately predetermined relative position, a second frame geometrically homothetical with the first frame and mounted on any suitable support and wherein the rough modelled block is so placed that the finished modelling will occupy the same relative position with respect to said second frame as the subject occupies with respect to its related frame. Finally an angularly orientable and adjustable support of any known type allowing the transparent image to be so positioned that the reference frame represented on said image will appear in optical register with the reference frame of the modelling, the consequence of this being that the finished modelling will necessarily coincide with each individual image placed in the thus defined position.

The equipment according to the invention may be simplified when it is desired to reproduce the subject in full size, because in this case the same reference frame may be used for the photograph as for the rough modelling.

The description of the equipment used as given above by way of illustration and not of limitation, and with reference to the accompanying drawings will provide a clear understanding of the manner in which my new method of modelling may be performed.

Fig. 1 illustrates in perspective a type of frame used for locating the position of the subject and its modelled reproduction.

Fig. 2 is a plan view of a device for securing the frame on the head of the subject.

Figs. 3, 4 and 5 show images of the subject as delineated on a transparency after a photograph.

Figure 6:
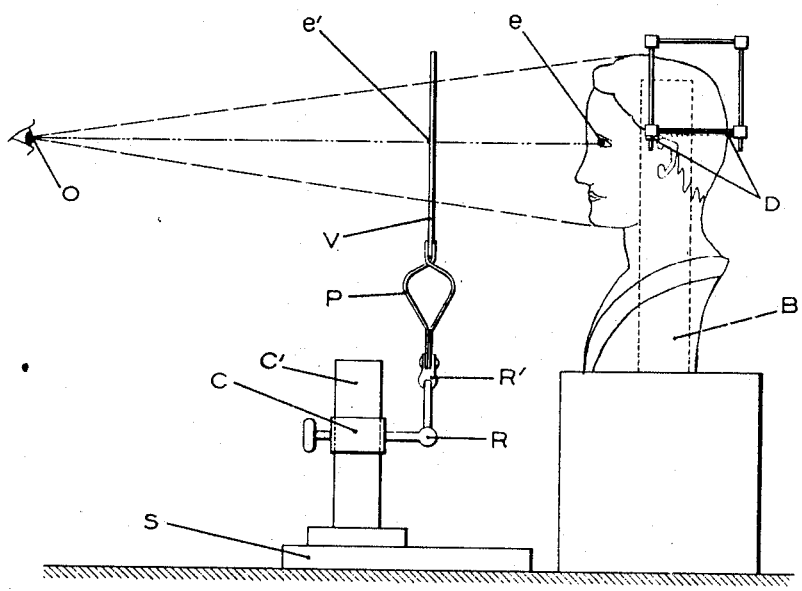
Fig. 6 is a side view of the assembly of modelling equipment.
Figure 7:
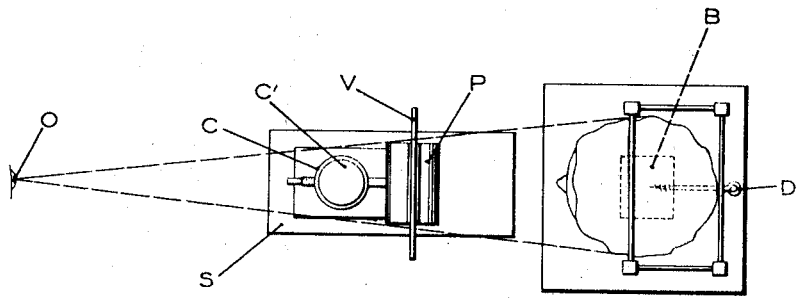
Fig. 7 is a plan view corresponding with Fig. 6.

The reference or locating frame is comprised of rods 1, 2 and 3 arranged along the edges of a parallelepiped and assembled together at the corners A through small cubic blocks 4 formed with apertures corresponding with the rods, and provided with set-screws which have not been shown.

The rods 1, 2, 3 form a reference system similar to a system of space-coordinates with respect to which the position of the subject is defined. The reference frame, in the case a bust is to be reproduced, is secured to the subject's head through a flat U-shaped member 5 provided with holes 6 into which the lower extensions of the vertical rod 1 are adapted to be fitted.

On the U-member 5 two symmetrical spring-plates 8 conformed to a suitable shape for surrounding the subject's head T, are secured in any suitable manner through one end 7 of each of said springs, while the opposite end 9 of each of the springs 8 is made to extend under the member 5 which is thus supported thereby, said ends being freely slidable against said member. Two strings or cords, H and K, attached to the springs 8 may be fastened over the head to support the member 5 and consequently the frame resting on said member.

The subject thus wearing the reference frame 1—2—3 supported on the U-member 5 is photographed from several different angles. The resulting photographs enlarged to a suitable size are then traced in their principal delineations upon a transparency, such as a glass plate for instance. Thus in Figs. 3, 4, 5, there are shown three images respectively corresponding to a front view, a three-quarters view and a profile.

The number of such views however is in no way restrictive. The photographs may desirably be taken simultaneously and in that case the reference frame may be secured on any suitable support, the essential requirement being that the subject be suitably placed with respect to said frame which is photographed simultaneously with the subject. Generally five photographs taken at a short distance, say two or three feet will be sufficient: namely, a front view, two side-views, and two three-quarter views. A photograph of the back of the head might also be useful to secure details of the head-dress.

The plastic modelling material is placed around a support B (Fig. 6) and is roughly shaped. A reference frame homothetical with the one used in photographing the subject (and of similar size if the modelling is made to full scale) is secured on the support B by any suitable means for instance with three screw-pins such as D screwed into the stand B which may be made of wood.

The operator will generally first use the front image reproduced on the glass plate V, said plate being clamped in a spring clamp P mounted on a support provided with universal swivel-joints R and R' and secured on a bushing C slidably mounted on a vertical upright C' in turn secured on a base plate S which may be movably located on a horizontal table.

The position of the plate V is so adjusted that the reference lines 1'—2'—3' of the image as observed with the operator's eye O will be brought into perfect register with the corresponding reference lines 1—2—3 of the reference frame secured on the modelling. In such position the left eye e of the modelling should be located on the line of sight Oe', e' being the image of the left eye as represented on the glass plate V.

By operating in a similar manner with the side view (Fig. 5) and the three quarters view (Fig. 4), the eye e may be accurately positioned with respect to the reference frame supported on the modelling. This also applies to any selected point, other than the eye, on the face or figure to be reproduced.

In practice, the operator will first attempt to make utmost use of the subject's face, by marking the useful points on the modelling material and attempting to obtain an outer contour of the modelling which will coincide with the contour of the image as viewed through a transparency.

The artist will then move the glass plate aside and will draw his work closer so as to be able easily to model it with his hands, according to conventional practice, being guided in this procedure in the first place by the previously marked points and also by the enlarged photoprints which he is able to use in the optimum conditions of accuracy as a result of the use of the frame.

Any points which may have become deleted or erased during the modelling process may again be marked on the plastic material by placing in front of the work the glass plate carrying the front image, after which the operator will rotate the bust in progress about a quarter of a turn and will present the corresponding glass plate to one of the photographs in profile (Fig. 5). As before, he will cause registry of the image of the frame with the real frame carried by the modelling, and the markings observed in a second direction can be located along the depth dimension.

By similarly using the opposite profile the location of all the points may thus be completely determined.

After each checking operation and each locating operation upon the modelling, of the points marked by observing said modelling through one of the transparencies, the artist pursues his work and the resemblance with the subject is gradually brought out more and more.

The images corresponding with the three-quarters photographs indicate with precision certain details which do not sufficiently stand out in the profile views. In particular they facilitate obtaining a greater fineness in the relief, making the reproduction of the face very lifelike and conferring to the work the qualities of a good portrait.

It is obvious that the modelling method according to the invention may be applied to reproductions of all kinds and that the equipment used may be widely varied as to its constructional details while still fulfilling the requirements of the invention. In particular the invention may be advantageously applied to carved sculpture, terra cotta, etc.

What I claim is:

A method for the reproduction on any desired scale of a model by modelling a block of plastic material and utilizing a first reference frame formed with simple lines, a second reference frame similar to said first reference frame on the said desired scale, comprising: positioning said first reference frame in a fixed position relatively to said model, taking photographs of said model with said fixedly positioned first frame from different points of view, reproducing an image of each of said photographs on transparent supports, positioning said second reference frame substantially in the same position relatively to said block of plastic material as the said first reference frame relatively to said model, positioning each of said reproduced transparent images in such a way as to cause the transparent image of said first reference frame to be observed coincident with said second reference frame, marking on said block of plastic material the points where the visual rays passing through characteristic points in said images meet said block respectively, whereby each of the characteristic points of the model corresponding to said characteristic points, when observed through two of said transparent images may be exactly positioned with respect to said block of plastic material without any measurement.

CHARLES ROUX.

REFERENCES CITED

The following references are of record in the file of this patent:

UNITED STATES PATENTS

| Number | Name | Date |
|---|---|---|
| 365,385 | Johnson | June 28, 1887 |
| 537,094 | Windsor | Apr. 9, 1895 |
| 647,608 | Pietzner | Apr. 17, 1900 |
| 2,085,400 | Tomozawa | June 29, 1937 |

OTHER REFERENCES

Latest Thing in Photosculpture, Literary Digest, page 588, Mar. 26, 1910. (Copy in Div. 67.)